June 16, 1964  J. W. HENDRY  3,137,035
EXTRUDER SCREW WITH RIGHT ANGLE DISCHARGE
Filed May 8, 1963

INVENTOR.
JAMES W. HENDRY
BY
Woodhams, Blanchard & Flynn
ATTORNEYS

United States Patent Office 3,137,035
Patented June 16, 1964

3,137,035
EXTRUDER SCREW WITH RIGHT ANGLE DISCHARGE
James W. Hendry, Scottsburg, Ind., assignor to Borg-Warner Corporation, Chicago, Ill., a corporation of Illinois
Filed May 8, 1963, Ser. No. 278,866
5 Claims. (Cl. 18—12)

This invention relates to plastic extrusion screws and particularly to such a screw in which the end adjacent the discharge port is positively supported for rotation and the plastic material itself is used to lubricate same at such point of support.

The majority of conventional plastic extrusion devices are arranged for discharge from the end of the extrusion screw and in a direction parallel to the axis of such screw. This procedure is well known and is satisfactory for most purposes. However, in those instances where it is preferred to discharge the plastic material directly downwardly, the arrangement of such a device with its axis positioned vertically is awkward and has normally been avoided. Hence it is in such cases preferable, if possible, to maintain the screw with its axis in a horizontal direction and to discharge the plastic material radially from a point spaced suitably from the inlet zone of the screw. This, however, raises a further problem in connection with the bearing means by which the end of the screw adjacent the discharge port is supported in that conventional bearing means, no matter how well sealed, will almost inevitably leak at least a minor amount of lubricant from the bearing into the plastic material and thereby discolor or otherwise contaminate the extrusion.

Accordingly, the objects of the invention include the following:

(1) To provide a plastic extrusion screw adapted for sideward or radial discharge.

(2) To provide a plastic extrusion screw, as aforesaid, and bearing means for supporting the end of said screw removed from the feeding end thereof which will insure against contamination of the plastic material being extruded.

(3) To provide a plastic extrusion screw, as aforesaid, which will utilize the plastic material itself as the lubricating material.

(4) To provide a plastic extrusion screw, as aforesaid, which will divert a small quantity of plastic material from within the extrusion cylinder and expel it through the bearing for the combined purpose of utilizing the plastic material as a lubricant and to insure against the entry of contaminants into the body of material being expelled through the extrusion die.

(5) To provide a device, as aforesaid, which will be extremely simple and can accordingly be built at a minimum of initial cost and which can be maintained in good operating condition at a minimum of maintenance cost.

Other objects and purposes of the invention will become apparent to persons acquainted with this general type of apparatus upon reading the following disclosure and upon inspecting the accompanying drawings.

Figure 1:
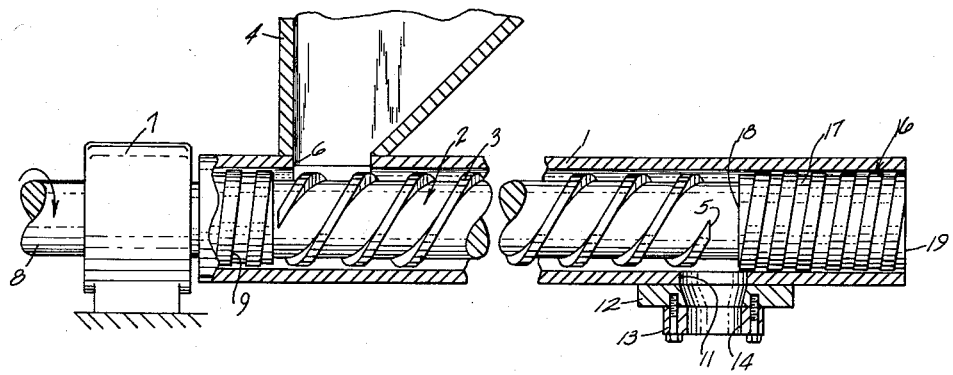
FIGURE 1 is a broken view partially in central section and partly in elevation of an extruder embodying the invention.

In the following description, certain terminology will be utilized solely for convenience and will have no limiting significance. For example, the terms "upwardly" and "downwardly" will be used in connection with the normal position of operation of the machine as shown in the accompanying drawings. The terms "rightwardly" and "leftwardly" will be utilized in connection with reference to the accompanying drawings. The terms "inwardly" and "outwardly" will refer to directions toward and away from the geometric center of the apparatus. Said terminology will also include derivatives of the words above specifically mentioned together with other words of similar import.

*General Description*

In general, the invention comprises providing adjacent the discharge end of a sidewardly discharging screw an enlarged portion constituting a bearing for said end of said screw and further providing on said enlarged portion shallow grooves of the same hand as the flights of the screw for diverting and expelling through said bearing a small quantity of the plastic material being handled by the screw. Said plastic material expelled in this manner through the bearing is a very small proportion of the total material being handled by the screw, such as an amount of less than one or two percent, but is sufficient to act both as a lubricant and to prevent the entry of contaminants.

*Detailed Description*

Referring now to the drawings, there is provided a conventional extrusion cylinder 1 having therein a rotatable screw 2 with conventional flights 3. A hopper 4 is located adjacent one end of said screw and communicates therewith through an opening 6 in the side of the extrusion cylinder 1. A suitable bearing 7 supports the screw adjacent the feeding end thereof and said screw is rotated in any convenient manner through a shaft 8 connected therewith. If desired, conventional threading 9 may be provided to prevent plastic material supplied through the opening 6 from escaping adjacent the inlet end of the screw.

Adjacent the discharge end of said screw there is provided in a conventional manner an opening 11 through the side of the extrusion cylinder 1 adjacent to which is attached a mounting plate 12 and an extrusion die 13. Said extrusion die 13 has a suitable material-shaping opening 14 therethrough and the mounting plate 12 has a suitable opening therein connecting the opening 11 with the opening 14.

The preceding description has disclosed only a standard extrusion device which is described herein only for illustrative purposes and which may be varied freely in ways which will be apparent to those skilled in the art without departing from the scope of the present invention.

Turning now to the feature of said screw comprising the invention, there is provided at the end thereof beyond the opening 11 an enlarged bearing portion 16 which is of diameter only sufficiently less than the internal diameter of the extrusion cylinder 1 to permit free rotation of said screw within said extrusion cylinder. Its length is usually about equal to its diameter but in any event is long enough to carry the bearing load placed thereon and to prevent excessive escape of plastic material through the hereinafter-mentioned groove. A suitable number, here shown as one for convenience in description, of shallow grooves 17 extend through the bearing portion 16, said groove being of the same hand as the threads 3. Said groove begins with a portion at 18 communicating with the interior of the extrusion cylinder 1 and terminates at 19 at the outermost extremity of the bearing portion 16.

The groove 17 is made very shallow, being of only sufficient depth, in view of its length and width in a given case, as to permit an extremely minor amount of material to escape through said bearing portion 16 from the interior of extrusion zone 1. The depth of said groove will, of course, depend somewhat on the nature of the plastic material being handled and the pressure under which it is being extruded, said groove obviously being of much less depth for a material of low viscosity than it will be for a material of high viscosity. For example, however, in the case of a screw of four inches maximum diameter and handling a high viscosity material, such as unplasticized polyvinyl chloride, polyoxy-methylene or a copolymer of acrylonitrile, butadiene and styrene, a depth of 0.005 inch for a groove of one inch in width, and having three flights in a bearing portion of four inches in length, will be found adequate.

The bearing portion 16 will, first, be of sufficient length that the lands between the portions of the groove 17 will adequately carry the load of the screw 2 with a minimum of wear and will, second, be of sufficient length that plastic material will not be propelled too rapidly through the groove 17 from the interior of the extrusion cylinder 1. It is essential that there be sufficient frictional resistance to the passage of plastic material therethrough that said plastic material will move therethrough only as a result of its being positively so urged by the rotation of said screw and so that the pressure developed within extrusion cylinder 1 will be insufficient to propel plastic material through said groove when the screw 2 is not rotating.

Figure 2:
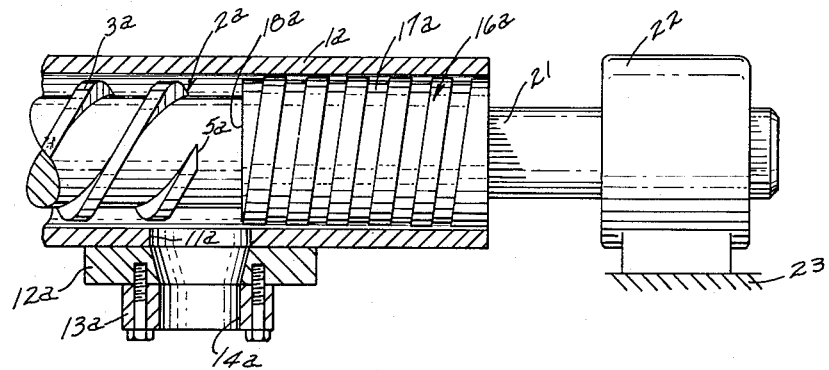
FIGURE 2 is a fragmentary view in central section of an extruder substantially similar to that of FIGURE 1 and illustrating a modification.

Turning now to FIGURE 2, there is shown a modification of the structure of FIGURE 1 wherein the bearing function of the bearing zone 16 is performed or at least supplemented, by an outboard bearing but wherein the outboard bearing is spaced therefrom so that lubricant used within said bearing cannot enter into the extrusion cylinder and contaminate the extrusion material. The parts of the construction shown in FIGURE 2 which are identical with the corresponding parts of FIGURE 1 are indicated by the same numbers together with the subscript "a." Thus, it will be seen that the extrusion cylinder and the portion of the screw within said cylinder are identical with the corresponding construction described in connection with FIGURE 1. However, in FIGURE 2 there extends from the outboard end of the screw 2a a shaft 21 which is received into a bearing 22. The bearing 22 is suitably mounted as desired upon the base structure 23 which is rigid with respect to the extrusion cylinder 1. The bearing 22 may be of any conventional construction whose details are not important to the present invention and hence are not shown.

Operation

Referring first to FIGURE 1, material is fed from the hopper 4 into the extrusion cylinder 1 in any convenient manner, either by gravity or forced feed as desired, and is propelled by rotation of the screw 2 rightwardly in the usual manner. However, the bearing portion 16 at the rightward end of said screw provides a barrier to the rightward motion of plastic material therepast and hence directs said plastic material outwardly through the opening 11 and parts associated therewith. A small amount of plastic material, however, such as 1 or 2 percent thereof will move on rightwardly through the groove 17 and act as a lubricant between the lands of the bearing portion 16 and the opposed internal walls of the extrusion cylinder 1. As a specific example, in one run of 5,000 pounds of unplasticized polyvinyl chloride, poly-oxy-methylene and acrylonitrile, butadiene and styrene copolymers sufficient lubrication of the bearing portion 16 was obtained by a leakage of 86 pounds, or 1.72 percent of the total, through the groove 17. It should be emphasized, however, that the plastic material is driven by the rotation of the screw 2 through the groove 17 so that when said screw 2 stops rotating, even though plastic material remains therewithin at extrusion pressure, there will be no appreciable bleeding of same out of the extrusion cylinder 1 through the groove 17.

A further advantage of the present construction is that the completely unobstructed rightward end of extrusion cylinder 1 makes it possible to withdraw the screw 2 out from said extrusion cylinder very simply and without appreciable dismantling of the machine.

In connection with FIGURE 2, the wear of the said lands may be minimized by supplementing their bearing function by the bearing 22, and the lubricating aspect of the groove 17a will continue as previously. However, in this form of the invention it will be possible to lubricate the bearing 22 by conventional lubricants without danger of contaminating material within the extrusion cylinder. In view of the outward movement of plastic material through the groove 17a, such protection from contamination will be obtained even if the bearing 22 is placed snugly adjacent the rightward end of the extrusion cylinder 1a.

In this form of the invention, the screw 2a cannot be withdrawn rightwardly quite as easily as it can in the form of FIGURE 1, but such withdrawal may be made relatively easily merely by demounting the bearing 22 from the base 23 and disconnecting said screw from the motor driving same.

Although particular preferred embodiments of the invention have been hereinabove described in detail for illustrative purposes, it will be recognized that variations or modifications of such disclosure, which lie within the scope of the appended claims, are fully contemplated.

What is claimed is:
1. In an extrusion device, the combination comprising:
    an extrusion cylinder having a central opening therein, an inlet opening adjacent one end thereof and a sidewardly directed outlet opening adjacent the other end thereof;
    a rotatable screw within said central opening and extending past said outlet opening, said screw being provided with at least one propelling thread thereon extending from said inlet opening to a point substantially adjacent said outlet opening of a depth for carrying and propelling plastic material to and through said outlet opening and being further provided from said outlet opening to the adjacent end of said screw with a shallow helical groove of the same hand as said thread and comprising an area such that the remaining lands are sufficient to provide bearing support for said screw and the cross section and length of said groove are sufficiently restricted that only a minor quantity of plastic material will be propelled therethrough;
    whereby said minor quantity of plastic material propelled through said groove will act as a lubricant for the bearing portions thereof and to maintain the interior of said extrusion cylinder free from contamination.
2. The device defined in claim 1 wherein the width of said groove is of the order of two hundred times its depth.
3. The device defined in claim 1 wherein said grooves are of the order of 0.005 inch in depth.
4. The device defined in claim 1 wherein said grooves are of the order of 0.005 inch in depth and one inch in width.
5. The device defined in claim 1 including also a stub shaft extension beyond said end of said screw and bearing means supporting said stub shaft extension whereby the bearing load on said lands is minimized.

No references cited.